9537X
E. M. Sharr,
Mortising Machine.
Patented Mar. 23, 1836.
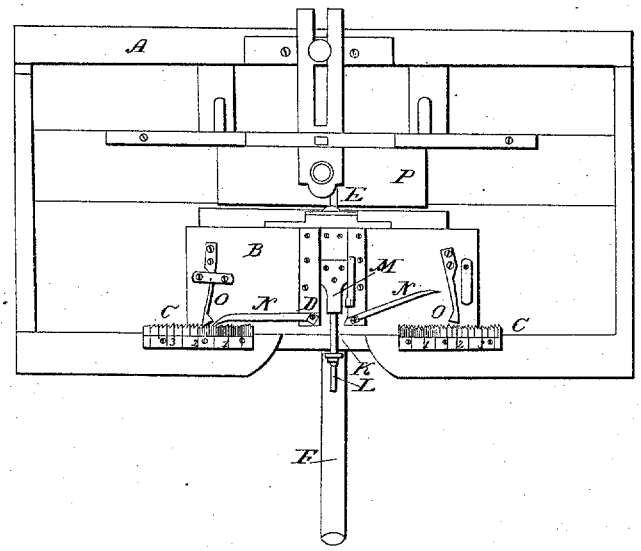
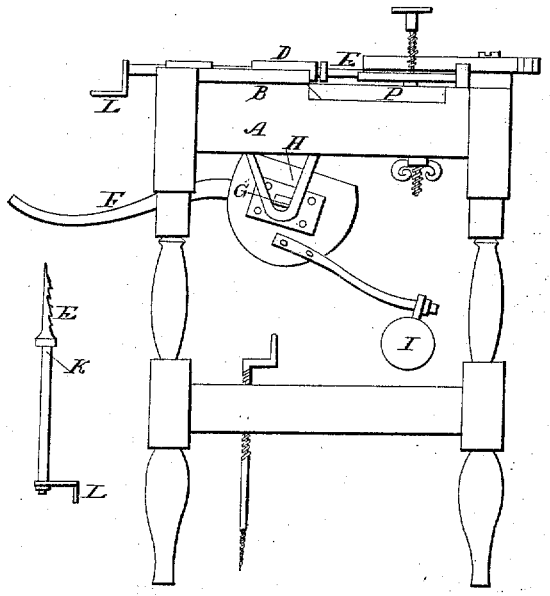
A.M. PHOTO-LITH'G. CO. N.Y. (OSBORNE'S PROCESS)

9537x Mar 23, 1836

Erastus M. Shaw of Wilbraham Massachusetts

Letters Patent.

The Schedule referred to in these Letters Patent and making part of the same contain-
ing a description in the words of the said Erastus M. Shaw himself of his improve-
ment "in the horizontal Mortising machine for mortising and tenoning timber.

Be it known that I Erastus M. Shaw of Wilbraham in the County of Hampden
State of Massachusetts, have invented a new and useful improvement in the ma-
chine for cutting Mortises and tenons called "Shaws horizontal mortising mach.
which is described as follows reference being had to the annexed drawings of the
same making part of this specification. This machine consists of a rectangular fram
adapted in size and strength to receive and support the different parts of the ma-
chinery to be hereafter described and is marked A in the annexed drawing.
The carriage B. is composed of a piece of timber in the form of a parallelogram
which is made to slide to the right and left on the top of the frame hereafter
described. and is held in its proper position by two plates C C screwed to the
side of the frame and lapped over the carriage In the centre of this carriage is
made an opening to receive a slide D in which the mortising Chisel or cutter
E is fixed. To the under side of the slide is attached a lever F. for moving the
slide by turning on a bolt or fulcrum G fixed to the lower side of the carriage,
having an opening made thro it to admit the rod H which connects the short
end of the lever to the slide and a weight I is suspended to the short end of the
lever to increase the force of the cutter. The cutter consists of an iron rod K passin
thro' the slide and made fast in it by a square shoulder pin. the end of the rod
next the timber to be mortised, is formed into a chisel or cutter. the other end
has a crank handle L. for turning it one end of the slide is formed into a triangula
cam M. for working the hands or palls [illegible] N rest upon the top of the carriage and
each has an oblong mortise near its end working over a pin in the carriage the
other end working in a rack formed on the edge of the plate C against the
end of each pall bears a spring O. for throwing it back when released by the
cam. A platform P. to support the timber to be mortised is placed upon the fram
and can be regulated for different widths of timber to be mortised by means of screws
or wedges. and the timber can be raised or lowered by screws passing through the

9537X

Mar 23, 1836 bottom of this platform. The whole machine may be secured to the floor by means of screws or other fastenings. The timber to be mortised is laid upon the platform and secured in its proper position by clamp screws. motion is then given to the slide which carries the chisel or cutter horizontally, by the lever which is moved by the hand up and down. the weight on the short end giving force to the cutter when the lever is pressed down the slide returns and the cam on its end works the pall which moves the carriage with the cutter &c whilst the timber remains stationary. when one cut is made the position of the cutter is changed. and the motion of the carriage reversed by throwing the second pall in and the first out of gear. the chips are drawn from the mortise by hooking the chisel The invention here claimed and desired to be secured by Letters Patent consists in the arrangement and adaptation of the several parts of the machine producing the one here described for mortising and tenoning timber. particularly the manner of operating the machine in causing the carriage to move to the right and left. whilst the slide with the cutter moves horizontally backward and forward at right angles to the carriage. I do not mean however to confine myself to any particular kind of material and dimensions of parts intending to vary these as well as their arrangement in any manner to produce the effect intended without changing the principle of the machine.

Erastus M. Shaw

[illegible] Witnesses

[illegible] Wm P. Elliot

Thos. Stettinius.

Drawing [illegible]